Jan. 14, 1969 T. R. PARKS ET AL 3,421,530
PRESSURE RELEASE VALVE
Filed Oct. 1, 1965

INVENTORS
Eugene R. Allard
BY Thomas R. Parks

Townsend and Townsend
Attorneys

United States Patent Office 3,421,530
Patented Jan. 14, 1969

3,421,530
PRESSURE RELEASE VALVE
Thomas R. Parks, 11452 Homeway Drive, Garden Grove,
Calif. 92641, and Eugene R. Allard, 824 Fulton Ave.,
San Leandro, Calif. 94577
Continuation-in-part of application Ser. No. 165,552,
Jan. 11, 1962. This application Oct. 1, 1965, Ser.
No. 527,621
U.S. Cl. 137—14                             2 Claims
Int. Cl. F17d 1/16; A23l 1/00

ABSTRACT OF THE DISCLOSURE

A method for use in the art of processing food, wherein a mass of a flowable food product having particulate material is allowed to be removed from a source of such food product in a manner to prevent substantial reduction of the particle size of the particulate material in the flowable food product. The path of flow of the food product is selected to maintain the pressure change on the food product below the change necessary to cause substantial reduction in such particle size. An annular, tapered passage is utilized to provide the fluid flow path.

---

This invention relates to valves. More particularly, it relates to pressure release valves for gradually releasing fluid pressure. This application comprises a continuation-in-part of our co-pending patent application for Pressure Release Valve, S.N. 165,552, filed Jan. 11, 1962.

The principal object of the present invention is to provide a valve for releasing fluid pressure gradually and controllably so that the structure of particulate matter that may be suspended therein and the carrier fluid are not wantonly and uncontrollably destroyed. Further features, objects, and advantages of the present invention will become apparent upon reading the following detailed specification in conjunction with the accompanying drawings in which there is shown:

FIG. 1 in side section, the release valve provided by the present invention linking inlet and outlet conduits, and wherein the valve is in closed position.

FIG. 2 in side section, shows the embodiment illustrated in FIG. 1 but wherein the valve is in open position permitting fluid communication between inlet and outlet conduits.

Figure 1:
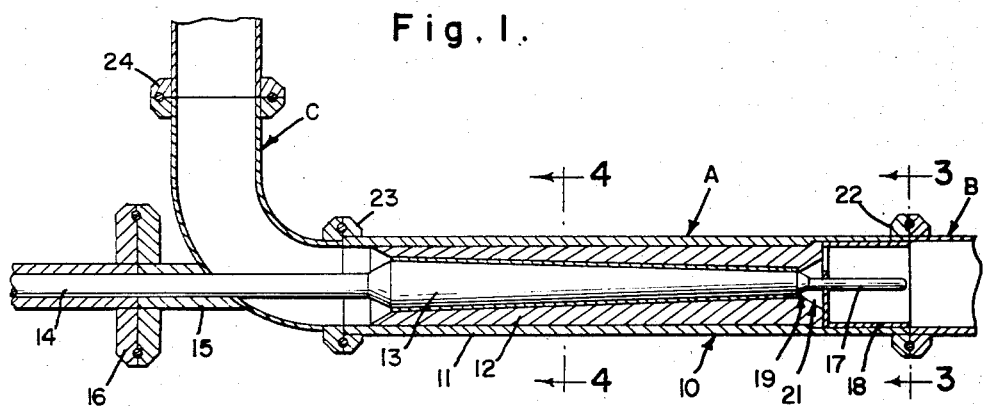
Figure 2:
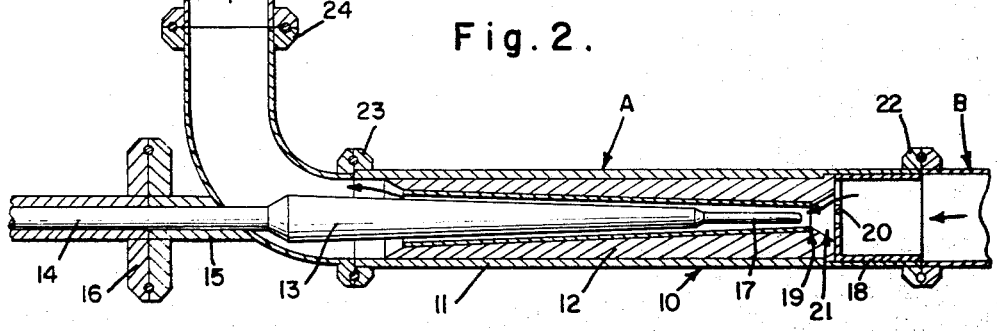
Figure 3:
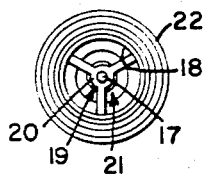
FIG. 3 is an end section of the embodiment illustrated in FIG. 1 taken along the line 3—3.
Figure 4:
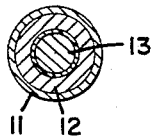
FIG. 4 is an end section of the device illustrated in FIG. 1 and taken along the line 4—4.

The gist of the preferred embodiment is in the use of a valve having long, gradually tapered plug and seat therefor. The pressure on the fluid is gradually released while passing from the narrow end to the wider end of the valve. This is achieved by the increase in volume of the fluid and by frictional losses during the journey through the valve around the plug.

With conventional types of pressure release valves there is a sudden and violent pressure drop of an explosive nature in the vicinity adjacent to the exit point from the pressure release valve. For many applications, this type of explosion is wholly undesirable.

For example, in the food processing industry where food particles are suspended in a liquid, or a foam, and transported through a pipe under pressure, and in a range of temperatures from about 0° to about 500° F., it is essential to maintain the cellular structure of the particle, or particle and foam product, and carrier fluid substantially intact. Random disintegration of the material and/or carrier fluid or foam produces uncontrolled changes in consistency which make for an unmarketable product. Thus, the need has arisen for a valve, at least in certain areas, in which the release of the pressure may be controlled so that the product and its consistency may be maintained at preselected values in a temperature range from about 0° up to about 500° F.

As used throughout this specification, the term foam is intended to include multiphase fluids having at least one liquid phase and one gas phase; and in all instances, as applied to this invention, a liquid or foam is intended as a carrier for particulate matter therein, e.g., a liquid comprising a puree or concentrate, or a foam made therefrom, as found in the food processing industry.

The present invention provides such a valve. In a preferred embodiment, the valve comprises a hollow, open-ended, elongated chamber having a gradually tapering frusto-conical interior for linking a higher pressure inlet conduit at the narrower end of the chamber to a lower pressure fluid outlet conduit at its other end. The length of the tapered interior surface of the chamber is at least as great as the diameter of the narrower end of the chamber.

A cooperatively tapered plug nests within the chamber. The plug is adapted for in and out movement from the chamber. The selected position of the plug in the chamber governs the fluid movement through the conduit.

In the preferred embodiment, there is also provided an elongated finger axially projecting from the narrow end of the plug. Also provided is a plug-aligning spider proximate to the narrow end of the chamber and axially aligned therewith for receiving the finger and aligning it with the plug in the chamber.

The present invention achieves the desired gradual and controlled pressure release for several reasons. The more important aspects may be summarized by reference to the Hagen-Poiseuille law well known to those skilled in the art and relating to losses of energy or head in pipes, assuming laminar flow. One form of this law may be expressed by the following equation:

$$p_1 - p_2 = \frac{32ulV}{d^2}$$

where $p_1$ equals the pressure at point 1 and $p_2$ equals the pressure at point 2 and thus $p_1 - p_2$ represents the pressure drop. V is the velocity of the fluid, $l$ is the length of the pipe between points 1 and 2, $d$ is the diameter of the pipe, and $u$ is the coefficient of viscosity of the fluid.

Reference to the foregoing formula indicates that the pressure drop is directly proportional to a given length of pipe while being inversely proportional to the square of its diameter. Thus, elongating a pipe and making its diameter smaller will cause a pressure drop. The frictional losses in causing a fluid to travel through a narrow diameter pipe for a relatively long distance are responsible for this pressure drop.

The other aspect of the present valve causing the pressure drop is in its special configuration wherein the liquid enters a smaller volume-containing area and then proceeds gradually to larger and larger volume-containing areas. The expansion that occurs when the fluid progresses from the restricted to the less restricted areas results in a pressure drop.

The frictional losses and the expanding volume both contribute to the efficient operation of the present device.

As already noted, it is not enough for certain purposes to merely cause a drop in pressure. Rather it is desired to cause a gradual and controlled pressure drop. The present device provides a gradual and controlled pressure drop by means of its unique structure. Thus, the relationship of the length of the tapered surfaces of the chamber is very large with respect to the diameter of the narrow or incoming end of the chamber. In this respect the present chamber and plug represent a marked departure from prior tapered plugs and holes wherein the length of the tapered portion was very small in relation to the diameter of the narrower inlet port.

In general, the length of the tapered surface of the chamber is large with respect to the narrower end of the chamber. In the preferred embodiment the length of the tapered surface of the chamber is at least as great as the diameter of the narrower open end of the chamber. The particular ratios to be used vary depending upon the following factors which are present during the contemplated use of the valve and include:

(1) The rate of pressure release sought.
(2) The product particle size in the fluid desired.
(3) The back pressure to be created by the valve and the rate of product flow desired.

The rate of pressure release is a function of the degree and length of the taper. The longer the taper, the more gradual the rate of pressure release. The particle size of the product emitting from the valve is determined by the difference between the plug and seat or chamber radii, i.e., the space between the plug and chamber when the plug is partially withdrawn. Back pressure varies inversely with the diameter of the narrower entrance to the plug chamber opening. Thus, the particular conditions and type of end product desired must be taken into consideration when adapting a valve provided by the present invention for a particular job.

Generally, the plug taper and chamber taper are quite gradual with the ratio of taper length to narrower opening diameter being large, i.e., about 1:1 to 1:15. It will be appreciated that the upper limit 1:15 is more practical than theoretical. In most cases it will serve no useful purpose to increase the ratio beyond this point and the cost of the valve would only be increased by doing so.

Turning to the drawings, the preferred embodiment illustrated includes a valve section A, an inlet high pressure conduit B, and an outlet low pressure conduit C. Valve portion A comprises a gently tapering chamber 10. Chamber 10 includes an outer pipe 11 and a Teflon insert 12. The polytetrafluoroethylene material 12 was selected for its qualities of being an inert material, its ability to withstand temperatures up to 500° F., because products flowing therethrough do not adhere to it, and because the material is easily tooled and thereby simplifies construction. Many other materials could also be used such as stainless steel and the like as will be obvious to those skilled in the art.

A cooperatively shaped plug 13 is disposed within chamber 10 and adapted for in and out movement therefrom. In the position illustrated in FIG. 1, plug 13 is inserted seated and entirely within chamber 10. Fluid communication between conduits B and C is entirely interrupted. When plug 13 is withdrawn a preselected distance as shown in FIG. 2, fluid communication between conduits B and C is established along the path indicated by the arrows. Product particle size, back pressure, and the like as discussed above are controlled by the position of plug 13 selected.

A rod 14 is joined to plug 13 at the wider end of plug 13. Rod 14 extends exteriorly from conduit C. Suitable packing 15 around rod 14 prevents fluid leakage. A bracket 16 maintains rod 14 at the appropriate position of alignment with chamber 10. Means (not shown) such as an air-actuated piston or manual efforts are suitably applied to rod 14 to position plug 13 in the appropriate part of chamber 10.

The narrow forward end of lug 13 contains an elongated finger 17 axially projecting forwardly therefrom. A plug-aligning spider 18 is positioned proximate to and axially aligned with the narrow opening 19 of chamber 10. When plug 13 is inserted all the way into chamber 10 as in FIG. 1, finger 17 is guided by central aperture 20 of spider 18 to thereby align plug 13 in proper central position.

Between narrow opening 19 and spider 18, plug insert 12 is shaped to form a funnel or widened portion 21. Funnel shaped portion 21 facilitates the entrance of high pressure fluid through narrow entrance 19 to chamber 10.

Low pressure inlet conduit B is joined to valve section A by a suitable clamp fitting 22. Similarly, outlet conduit C is joined to valve section A by suitable clamp fittings 23, 24.

Although the foregoing invention has been described in some detail by way of illustrating and example for purposes of clarity of understanding, it is understood that certain changes and modification may be practiced within the spirit of the invention as limited only by the scope of the appended claims.

What is claimed is:

1. In the art of processing food, the method of controlling a flowable food product containing particulate material capable of being reduced in particle size by a predetermined change in pressure thereon comprising: preparing the food product in the form of a puree having at least one liquid phase and being in the temperature range of 0° to 500° F.; providing a gently tapering, frusto-conical chamber; adjustably blocking the central portion of the chamber to present a frusto-conical outer peripheral space defining a flow path for a mass of the pureed food product with said space progressively and gradually increasing in volume as the larger diameter end thereof is approached; placing the smaller diameter end of said space in fluid communication with a source of said pureed food product under pressure to allow the food product to enter and move through the space with the volume of the space being sufficient to permit the flow of said fluid product through said space and to experience a change in fluid pressure less than the fluid pressure change at which the particle size of said particulate material is substantially reduced, whereby the structural integrity of said particulate material remains substantially intact; and collecting the food product after it has moved through said space.

2. In the art of processing food, the method of controlling a flowable food product having food particles therein capable of being reduced in particle size by a predetermined change in pressure thereon comprising: providing a control valve having a gently tapering, frusto-conical chamber and a core adjustably blocking the central portion of the chamber to present a frusto-conical, outer peripheral space gradually increasing in volume as the larger diameter end thereof is approached; providing a source of said food product under pressure; directing a mass of the food product away from said source and into the smaller diameter end of said outer peripheral space under the influence of the pressure of said source; controlling the movement of said mass of food product through said space to permit the change of pressure on said mass to be below the value of the fluid pressure change necessary to cause substantial reduction in the particle size of the food particles in the food product directed away from said source; and collecting the food product at a location remote from said source.

References Cited

UNITED STATES PATENTS

| | | | |
|---|---|---|---|
| 168,783 | 10/1875 | Riley | 251—122 X |
| 1,085,195 | 1/1914 | Butler | 251—122 X |
| 1,502,654 | 7/1924 | Blanchard | 251—122 X |
| 2,162,842 | 6/1939 | Dolison et al. | 137—12.5 |
| 2,173,979 | 9/1939 | Picut | 251—122 |
| 2,725,212 | 11/1955 | Jensen | 251—122 |
| 2,822,789 | 2/1958 | Philips et al | 251—122 X |
| 2,899,170 | 8/1959 | Cornelius | 251—122 |

M. CARY NELSON, *Primary Examiner.*

ROBERT C. MILLER, *Assistant Examiner.*

U.S. Cl. X.R.

99—1